(12) United States Patent
Steele

(10) Patent No.: US 8,256,448 B2
(45) Date of Patent: Sep. 4, 2012

(54) HIGH TEMPERATURE BUTTERFLY VALVES

(75) Inventor: James R. Steele, Stillwater, MN (US)

(73) Assignee: Dynamic Air Inc., St. Paul, MN (US)

( * ) Notice: Subject to any disclaimer, the term of this patent is extended or adjusted under 35 U.S.C. 154(b) by 1162 days.

(21) Appl. No.: 12/150,715

(22) Filed: Apr. 30, 2008

(65) Prior Publication Data

US 2009/0272926 A1 Nov. 5, 2009

(51) Int. Cl.
*F16K 25/00* (2006.01)

(52) U.S. Cl. ........ 137/240; 251/173; 251/307; 277/605; 277/646

(58) Field of Classification Search ............. 251/173, 251/305–308; 137/340; 277/605, 646
See application file for complete search history.

(56) References Cited

U.S. PATENT DOCUMENTS

| | | | | |
|---|---|---|---|---|
| 1,834,988 A * | 12/1931 | White | | 251/173 |
| 1,844,641 A * | 2/1932 | De Wein | | 251/173 |
| 1,990,309 A * | 2/1935 | Phillips | | 137/246.22 |
| 2,081,842 A * | 5/1937 | Sharp | | 251/173 |
| 2,705,016 A * | 3/1955 | Saar | | 137/1 |
| 2,970,803 A * | 2/1961 | Harza | | 251/175 |
| 3,026,083 A * | 3/1962 | McLaren et al. | | 251/173 |
| 3,043,557 A * | 7/1962 | Stillwagon | | 251/306 |
| 3,596,876 A * | 8/1971 | Scaramucci | | 251/306 |
| 3,692,276 A * | 9/1972 | Conners et al. | | 251/306 |
| 4,176,675 A * | 12/1979 | Liberman | | 137/340 |
| 4,176,820 A * | 12/1979 | Broadway | | 251/317 |
| 4,800,915 A * | 1/1989 | Hormel | | 137/340 |
| 4,836,499 A * | 6/1989 | Steele et al. | | 251/173 |
| 5,158,265 A * | 10/1992 | Miyairi | | 251/305 |
| 5,160,118 A * | 11/1992 | Stary | | 251/173 |
| 5,295,659 A * | 3/1994 | Steele | | 251/173 |

* cited by examiner

*Primary Examiner* — John Bastianelli
(74) *Attorney, Agent, or Firm* — Jacobson & Johnson LLC

(57) ABSTRACT

A butterfly valve for handling materials where the temperature of the materials flowing through the butterfly valve can exceed the breakdown temperature of the sealing member with the butterfly valve inhibiting contact of hot transportable materials with the sealing member to isolate the hot transportable materials from the sealing member. Cooling conduits maintain at least portions of the valve that contacts the sealing member at a temperature below the breakdown temperature of the sealing member to prevent seal failure.

9 Claims, 5 Drawing Sheets

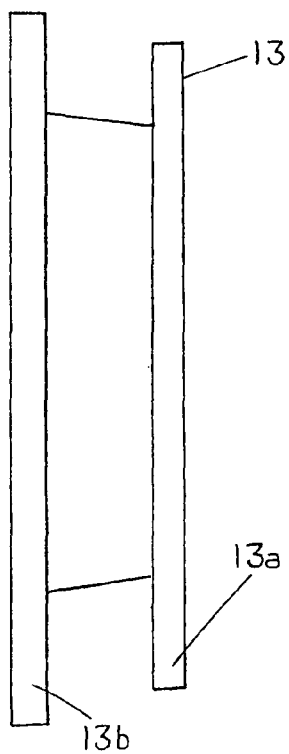
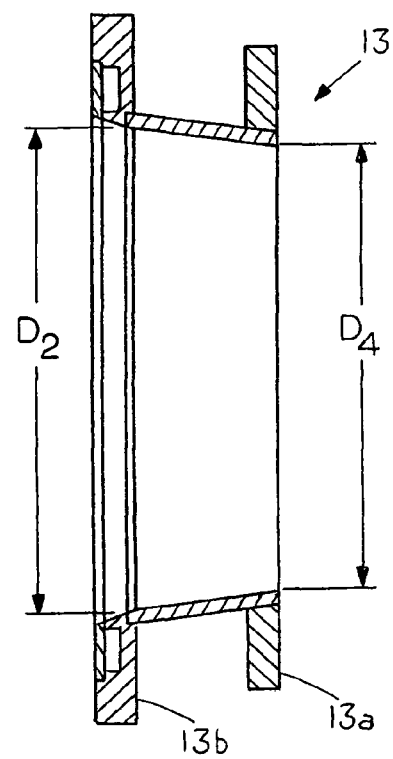
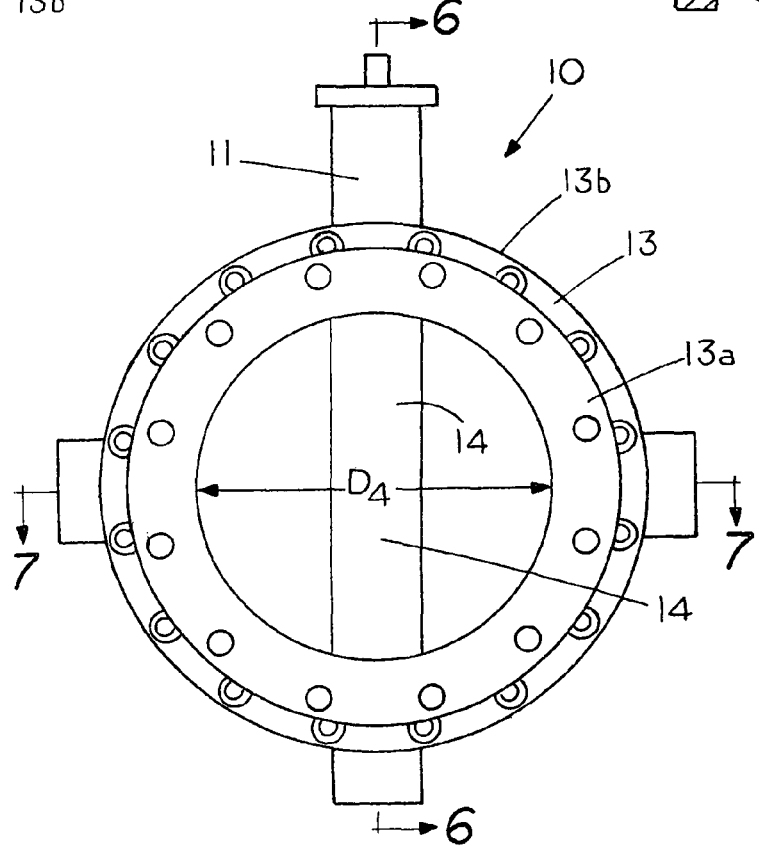

HIGH TEMPERATURE BUTTERFLY VALVES

FIELD OF THE INVENTION

This invention relates generally to butterfly valves and, more specifically, to butterfly valves for use with hot materials.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of butterfly valves with a central disk is known in the art. One such butterfly valve is shown in Steele et al. U.S. Pat. No. 4,836,499 and another is shown in Steele U.S. Pat. No. 5,295,659. In both valves a central disk pivots from a transverse or closed position, where the disk extends across a flow passage to block materials from passing through the valve, to an axial or open position, where materials enter one side of the valve and flow laterally alongside the disk face before being discharged from the opposite side of the valve. To seal the valve the disk is positioned in the transverse position and an annular elastomer seal or sealing ring is inflated to engage an edge of the disk to form an annular seal around the periphery of the disk. To pivot the disk to an open condition or flow through condition the elastomer seal is deflated and the disk is pivoted from the closed position to an open position.

One of the difficulties of handling hot material with butterfly valves is that the seals used in the butterfly valves are generally elastomers which have a low breakdown temperature. Often times the breakdown temperature of the elastomer seal is below the temperature of the material being transported. An exposure of the elastomer seal to high temperature materials, even if limited, can cause failure of the seal. Consequently, butterfly valves are used for handling materials that are at temperatures below the breakdown temperature of the elastomer seal to in order to avoid seal failure.

SUMMARY OF THE INVENTION

A butterfly valve for handling materials where the temperature of the materials flowing through the butterfly valve can exceed the breakdown temperature of the sealing member with the butterfly valve inhibiting contact of hot transportable materials with the sealing member to isolate the hot transportable materials from the sealing member. Cooling conduits maintain at least portions of the valve that contacts the sealing member at a temperature below the breakdown temperature of the sealing member to prevent seal failure.

BRIEF DESCRIPTION OF THE DRAWINGS

FIG. 3 is a side view of a collar of the high temperature butterfly valve of FIG. 1;

FIG. 4 is a sectional view of the collar of FIG. 3;

FIG. 5 is an end view of the butterfly valve;

DESCRIPTION OF THE PREFERRED EMBODIMENT

Figure 1:
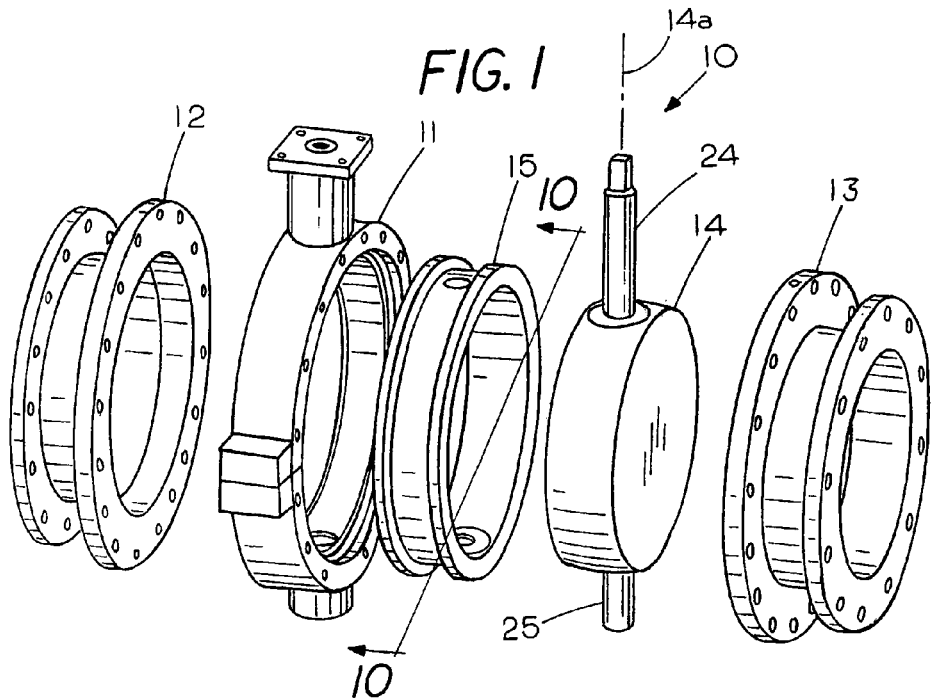
FIG. 1 is an exploded view of a high temperature butterfly valve.

FIG. 1 is an exploded view of a high temperature butterfly valve 10 that can handle materials that may exceed the breakdown temperature of a seal in valve 10. Typically, butterfly valves have annular seals, which are made from elastomers, that can expand to seal the valve and contract to allow the valve to open or close. Valve 10 includes an inlet collar 12, a housing 11, an inflatable annular seal 15, a rotateable disk 14 and an outlet collar 13. Inlet collar 12 and outlet collar 13 typically connect to a conduit, such as a pneumatic conduit, to direct the flow of materials through the butterfly valve 10. The disk 14 is pivotable about a spindle axis 14a to enable the disk 14 to be opened and closed. If disk 14 extends transverse to the conduit, as illustrated in FIG. 1, it prevents flow of materials through the valve 10. If disk 14 is pivoted 90 degrees about axis 14a the disk 14 is an open position with the disk parallel to a central axis of collars 13 and 14 to allow material to flow through the valve 10. The components of the valve 14, with the exception of the seals, are generally made of metals to withstand the forces and the temperatures of the materials that may contact the valve. The annular seal 15, which is required to expand to seal the valve and contract to unseal the valve, are typically made from materials such as elastomers that breakdown at a few hundred degrees. An example of an elastomer seal that expands and contracts to seal and unseal a butterfly valve is shown in Steele U.S. Pat. No. 4,836,499.

Figure 2:
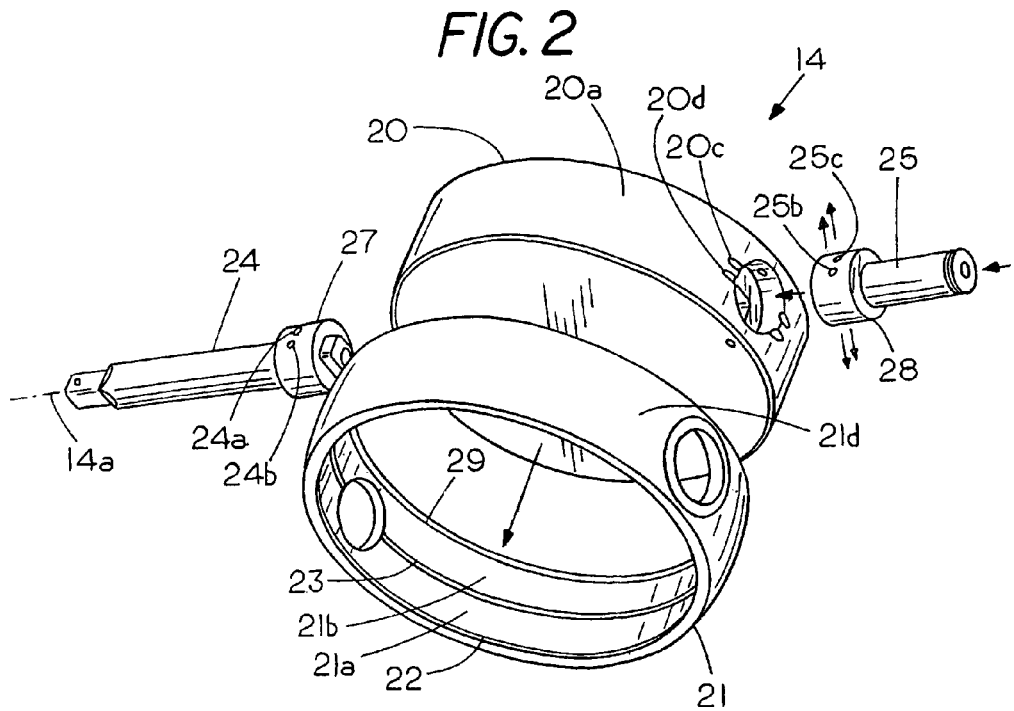
FIG. 2 is an exploded view of the disk of the high temperature butterfly valve of FIG. 1.
Figure 6:
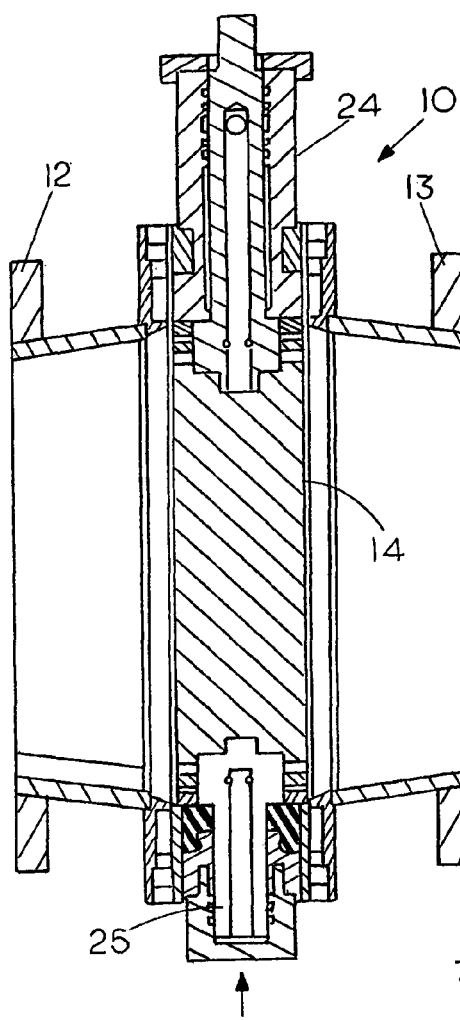
FIG. 6 is a sectional view taken along lines 6-6 of FIG. 5.
Figure 8:
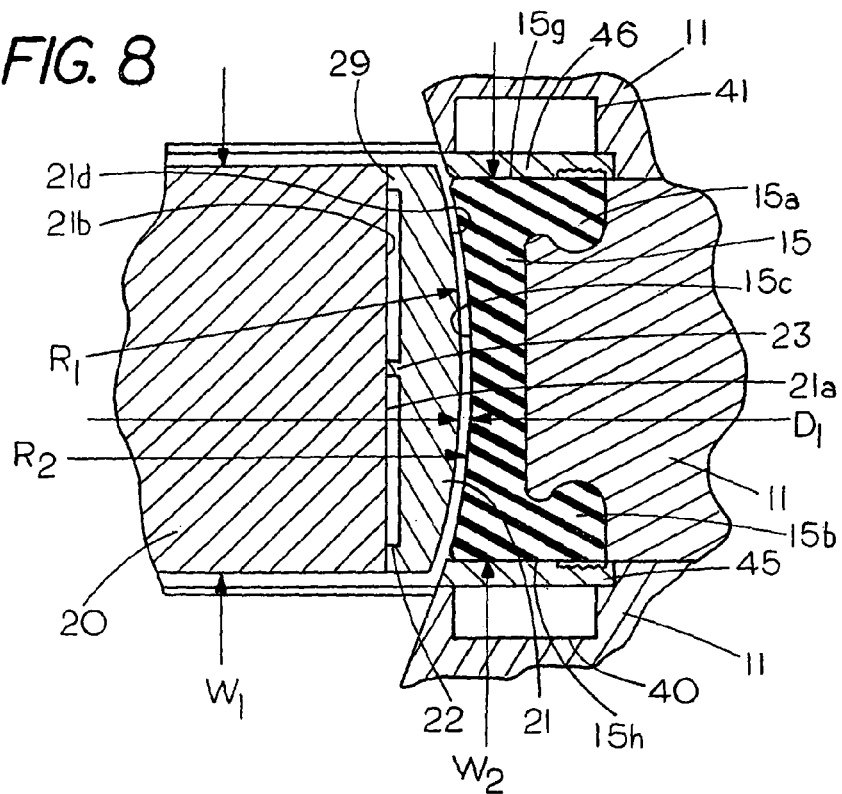
FIG. 8 is an enlarged section view of a portion of the disk and the annular seal in a non sealing mode.

FIG. 2 is an exploded view of disk 14 of the high temperature butterfly valve 10 of FIG. 1. Disk 14 includes a massive central disk member 20 and a rim 21 that fits on the peripheral face 20a of central disk member 20. Located on the interior of rim 21 are three rings, an outer rib or ring 29, a central rib or ring 23 and an outer rib or ring 22. A first annular cooling channel 21b is located between outer ring 29 and central ring 23. Similarly, an annular cooling channel 21a is located between central ring 23 and outer ring 22. When assembled sealing ring 21 is secured to central disk member 20. Spindle shaft 25 and spindle shaft 24 are secured to rim 21 and central disk member 20 allowing the disk 14, rim 21 and shafts 24 and 25 to operate as a single unit. For example, when rim 21 is placed on the peripheral surface 20a of central member 20 the peripheral surface 20a of central member 20 engages the rings 22, 23 and 29 so that annular cooling channel 21a in rim 21 and annular cooling channel 21b in rim 21 are internally bounded by surface 20a on disk member 20 to thereby form two side-by-side cooling conduits 21a and 21b. While two cooling channels are shown, more or less cooling conduits may be used to cool the surface 21d of the disk 14 that comes into contact with the annular seal 15. The position of the cooling conduits 21a and 21b with respect to central disk member 20 and annular seal 15 is shown in FIG. 8 as the central member 20 and rim 21 coact to form two peripherally cooling conduits which have an annular configuration and with an elongated cross section. The rim 21 and central member are secured to each other to maintain the rim 21 in fixed position on central member 20, for example rim 21 may be secured thereto by welding or the like. Central member 20, which can function as a heat sink to absorb heat from materials while the cooling system dissipate heat a constant rate although hollow central members may be used in some systems.

FIG. 2 shows that disk 14 includes a first hollow shaft 25 with a hub 28 extending outward from one end of central disk member 20 and a second hollow shaft 24 having a hub 27 extending outward from an opposite end of central disk member 20 with the shafts 24 and 25 located diametrically opposite from each other. Shafts 24 and 25 provide a dual purpose, first they allow one to rotate disk 14, about axis 14a, from the closed position to the open position and vice versa. In addition, both shafts permit the axial flow of a cooling fluid therethrough. When assemble the hub 28 fits in rim 21 with conduit 25b in fluid communication with passage 20d and conduit 25c in fluid communication with passage 20c. Similarly, identical fluid passages or conduits are located on the opposite side of hub 28 to direct cooling fluid therethrough (see arrows). Typically, shafts 24 and 25 may be affixed to rim 21 by welding or the like. In addition the disk member 20 may also be affixed to rim 21 by welding to form a disk 14 of unitary construction.

Figure 9:
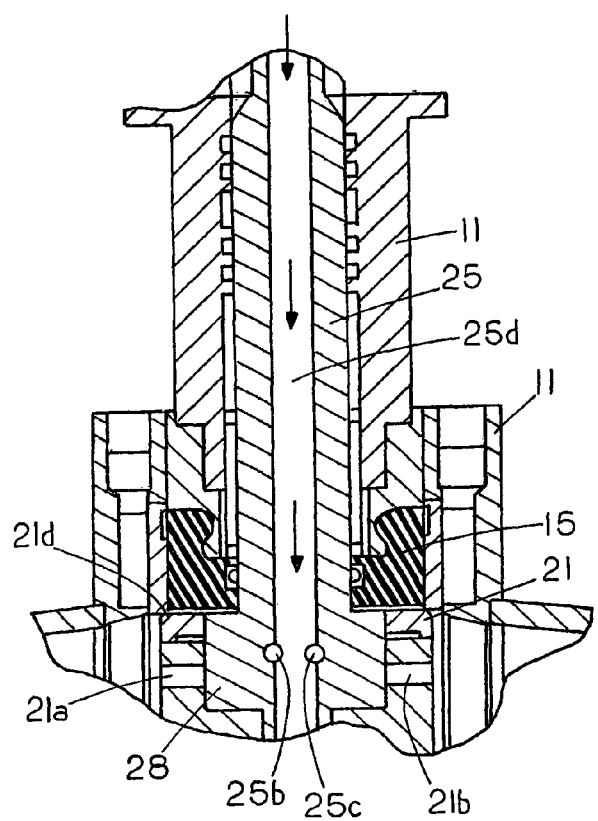
FIG. 9 is an enlarged sectional view of the butterfly valve shaft.

FIG. 2 shows the flow passages in shaft 25 allows a cooling fluid to be delivered into the annular cooling conduits 21b and 21a in periphery of disk 14, which are formed by disk surface 20a and cooling channels 21a and 21b. A reference to FIG. 9 shows an isolated sectional view of the shaft 25 located in housing 11 with a central passage 25d that directs a cooling fluid, indicated by arrows through the fluid passage 25b and 25c into the annular cooling channel 21a and the annular cooling channel 21b. As can be seen in FIG. 2 the fluid passages are located on both sides of shaft 24 so that cooling fluid can flow in opposite directions into peripheral disk cooling channels 21a and 21b. The fluid continues to flow through the peripheral disk cooling channels 21a and 21b until the cooling fluid enters ports 24a and 24b on shaft 24 and identical ports (not shown) located on the opposite side of shaft 24 (see FIG. 2). Consequently, in operation a cooling fluid enters shaft 25 flows into cooling channels 21a and 21b and then flows half way around the disk 14 before being discharged through the fluid passages in shaft 24. Thus a cooling fluid can be directed to the rim 21 of the disk 14 to maintain the rim surface 21d of rim 21 at a temperature that is less than the breakdown temperature of the annular seal 15. FIG. 9 shows the annular seal 15 with shaft 25 extending therethrough and the annular seal 15 proximate the peripheral surface 21d of rim 21. Thus, a feature of the invention is the use of a cooling conduit in the periphery of the disk 14 to maintain the peripheral edge of the disk 14, i.e. rim 21, which contacts the annular seal 15 below the breakdown temperature of the annular seal 15.

A further feature of the invention is that one or multiple features may be used to limit or inhibit the heat transfer from hot materials, which are controlled by the butterfly valve 10, to the annular seal 15 wherein the hot materials are at temperatures that could cause breakdown of the annular seal. By breakdown of the annular seal it is understood that the seal 15 may soften, erode or otherwise fail so that the disk 14 can not be properly sealed to prevent passage of materials therepast.

One of the features of the invention described herein is that disk cooling may be incorporated into a butterfly valve to inhibit seal deterioration when the materials handled by the butterfly valve exceed a breakdown temperature of the annular seal. In some cases where the temperature of the hot materials is near or at the breakdown temperature of the annular seal only one of the features may be used, for example disk cooling, and more specifically cooling of the disk parts such as the rim that come into contact with the annular seal. In other cases when the temperature of the hot materials greatly exceeds the breakdown temperature of the annular seal multiple features described herein may be used. In still other cases one may want to use all or selected features of the invention to ensure that the annular seal is inhibited from breakdown.

As hot materials that are handled by valve 10 may come into prolonged contact with the central disk member 20 one may want to minimize heat conduction between the massive central disk member 20 and rim 21. To do so one can provide minimal surface-to-surface contact between rim 21 and central disk member 20. That is, the rings 22, 23 and 29 can be made narrow in relation to the width of the disk 20 as illustrated in FIG. 8 thus minimizing the heat sink effect of the massive central disk member 20 by limiting a heat conduction path from the central disk member to the rim 21, which are a metal, for example stainless steel. Although metals are described for formation of central member 20 and rim 21 other materials may be used, particularly if the hot transportable materials are corrosive to metals.

Figure 7:
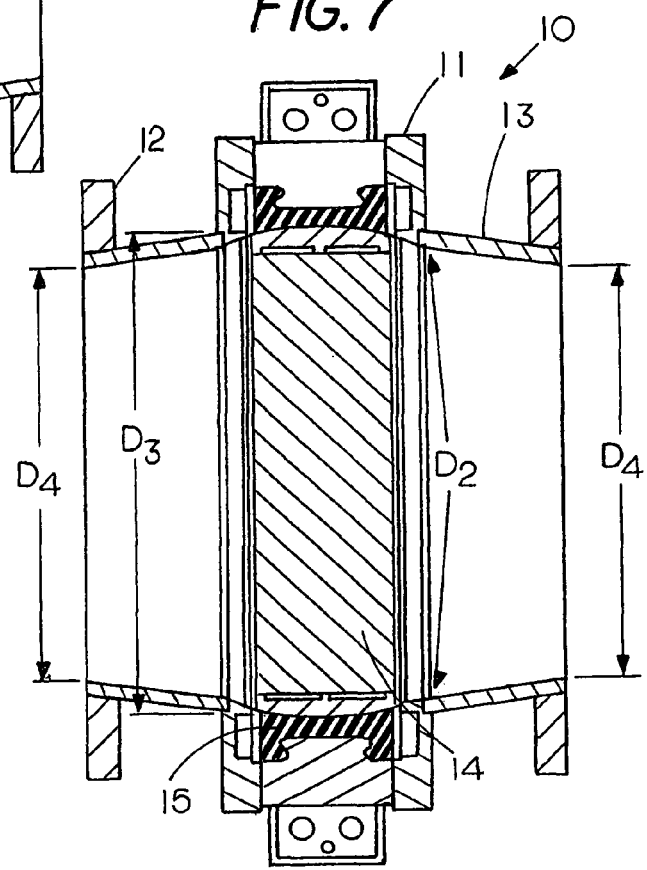
FIG. 7 is a sectional view taken along lines 7-7 of FIG. 5.
Figure 8A:
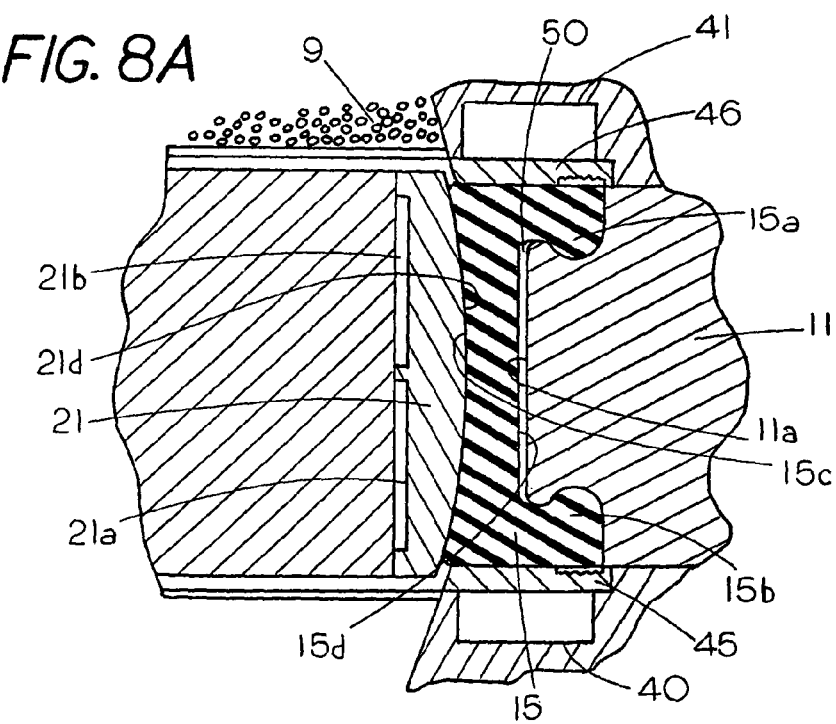
FIG. 8A is an enlarged section view of the portion of the disk of FIG. 8 in the sealing mode.
Figure 10:
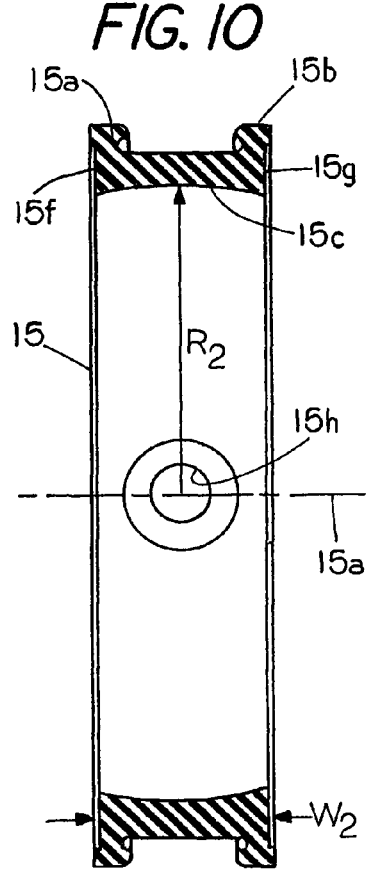
FIG. 10 is an isolated sectional view of the annular seal of the butterfly valve of FIG. 1.

FIG. 10 shows an isolated view of the inflatable annular seal 15 taken along lines 10-10 of FIG. 1 showing annular lobes 15a and 15b that can engage the housing 11 as illustrated in FIG. 8A and a shaft opening 15h. The annular seal 15 contains a curved disk sealing surface 15c having a radius of curvature $R_2$ that extends from central axis 15e. The radius of curvature of the sealing member surface 15c, which is measured from the central axis 15e to the outer surface 15c, is similar or identical to the radius of curvature $R_1$, (see FIG. 7 and FIG. 8) of disk 14. The similar or identical radius of curvatures allows the gap $D_1$ (see FIG. 8) between the annular sealing ring 20 and the peripheral of disk 14, which allows pivoting disk 14 from the open position to the closed position, to be minimized to thereby inhibit or prevent hot materials coming into contact with the annular seal 15 when the disk 14 is in the closed position as shown in FIG. 8A. By minimizing clearance $D_1$ between annular seal 15 and the disk 14 one can inhibit hot materials from contacting the annular seal 15 when the butterfly valve is in the closed condition since the annular seal has a limited exposure to hot materials 9 that can cause breakdown of the annular seal 15 due to the temperatures of the hot materials exceeding the breakdown temperature of the annular seal 15.

Thus a further feature that one may use to inhibit temperature breakdown of the annular seal 15 is to incorporate close tolerances, usually a few thousands of an inch for example less than 0.010 inches, between the annular seal sealing surface 15c and the disk periphery surface 21d to limit travel of the sealing surface 15c and thus limit the opportunity for the hot material to contact the annular seal 15 when in the expanded or sealed condition. FIG. 8 illustrates the close tolerance $D_1$ between surface 21a and sealing surface 15c on annular seal 15. Typically, the clearance is sufficiently large so as not to bind or hinder the opening and closing of disk 14 but sufficiently small so as to limit the ingress of hot materials into contact with the annular seal 15. Typically, in most cases a few thousands of an inch clearance is sufficient when the radius of curvature of the disk and the seal are identical or substantially equal.

A further feature which may be used to inhibit heat transfer to the annular seal 15 includes having the width $W_1$ of disk 14 greater than the width $W_2$ of the annular seal 15 as illustrated in FIG. 8A thus limiting the potential contact of the hot materials 9 with the annular seal 15. As a consequence the exposure of the annular seal 15 to hot materials is limited since lateral contact with the annular seal is the primary means for hot materials to contact annular seal 15 and hence the opportunity for breakdown of the annular seal 15 is inhibited or prevented.

A further feature which may to used further inhibit breakdown of seal 15 is sealing member cooling and housing cooling, for example FIG. 8 shows, a first cooling conduit 41 is located on a lateral annular face 15b of annular seal 15 and a second cooling conduit 40 is located on lateral face 15c of annular seal 15. Conduit 40 is formed by housing 11 and an annular heat conducting flange 45. Similarly, conduit 41 is formed by housing 11 and an annular heat conducting flange 46. While elastomers breakdown at temperature considerably less than the temperatures which metals can withstand they are also poor heat conductors. Nevertheless by placing cooling conduits on the opposed lateral faces 15g and 15h of annular seal 15 and limiting the contact area of the hot materials to the annular seal 15 one can cool the annular seal 15 to further inhibit breakdown of the annular seal 15 as housing 11, which supports the annular seal can also be maintained at a temperature below the breakdown temperature of the annular seal 15.

As can be seen in FIG. 8 and FIG. 8A the heat transfer between hot materials in the butterfly valve 10 and the annular seal 15 may be minimized through limiting the contact area of the annular seal 15 to the hot materials as well as through cooling valve components that come into contact with the annular seal 15. That is, by cooling valve components that come into direct contact with the annular seal 15 to temperatures which are below the breakdown temperature of the annular seal 15 one can further enhance the ability of the butterfly valve 10 to handle hot materials which may exceed the breakdown temperature of the annular seal.

FIG. 8A shows the annular seal 15 in the sealed condition with chamber 50 pressurized thereby causing a seal surface 15c on annular seal 15 to contact surface 21d on rim 21 to form a bubble tight seal therebetween.

The above features to inhibit temperature breakdown of the annular seal 15 may be combined, for example by having disk 14 wider than the annular seal 15 and simultaneously cooling the disk 20 and the annular seal 15 through the cooling passages located proximate thereto which can assist in maintaining the temperature of the annular seal 15 below the breakdown temperature of the annular seal.

FIG. 3, FIG. 4, and FIG. 7 illustrate still another feature which may be used to minimize contact of the hot transportable materials with the annular seal 15 when the disk 14 is in the open position. FIG. 3 shows collar 13 having a face plate 13a for attachment to a conduit and a face plate 13b for attachment to the housing 11 of butterfly valve 10. FIG. 4 is a cross section view of collar 13 showing the inlet has a diameter $D_4$ and the outlet a diameter $D_2$ with the diameter $D_2$ greater than the diameter $D_4$.

FIG. 5 shows an end view of butterfly valve with collar 13 opening having a diameter $D_4$ and a disk 14 located therein. As can be seen in FIG. 5 hot transportable materials can flow on both sides of disk 14 in a straight flow path since the annular seal 15 is radially offset and therefore impingement with annular seal 15 is inhibited.

FIG. 7 shows a cross section view of collar 13 and collar 14 attached to housing 11. Collar 13, which has an inlet diameter $D_4$, mates with the diameter of a conduit that delivers hot materials to butterfly valve 10, and has an outlet diameter $D_2$ which is larger than inlet diameter $D_4$. The internal diameter of collar 13 expands to a diameter $D_2$ at the disk 14 and reduces to a diameter $D_4$ at the second collar 14 to also mate with the conduit that receives the hot materials from the butterfly valve 10. The annular seal 15 has a diameter $D_3$ which is greater than $D_2$. Thus the annular seal 15 is radially offset from a straight line flow path through the valve 10 to further inhibit hot transportable materials from contacting the annular seal 15 as materials flows through the butterfly valve 10. That is, when the disk 14 is in the open condition the hot materials, which generally contain mass and sufficient momentum to inhibit radial outflow toward the elastomer seal 15 thus further inhibit direct contact and heat transfer from the hot materials to the annular seal 15.

It should be pointed out that while an annular seal 15 has been described herein other shapes of seals may be used with the shut off the valve to inhibit and prevent breakdown of the seal if the material being handle has a temperature that is above the breakdown temperature of the seal.

The invention further includes a method of intermittent delivery of hot conduit transportable materials though a valve 14 that includes portions of the valve that have a breakdown temperature that is less than the temperature of the transportable materials comprising the steps of: pivoting a disk 14 to a closed condition; expanding an expandable seal 15 until the expandable seal contacts only a portion of a rim 21 of the disk; directing a cooling fluid through at least one cooling conduit 21a, 21b in the rim 21 of the disk 14 to maintain the temperature of the portion of the rim that contacts the expandable seal 15 at a temperature that is below a breakdown temperature of the expandable seal. One can also including a step of directing a cooling fluid through a housing supporting the expandable seal. One can contract the expandable seal 15 and pivot the disk 14 to an open condition. Once in the open condition the method can include the step of directing a transportable material through housing 11 with the transportable material having sufficient momentum so as to inhibit or prevent bringing the transportable material from coming into contact with the expandable seal 15. The cooling fluid may be directed into a first shaft 25 and out a second shaft 24 with the first and second shaft located diametrically opposite from each other.

I claim:

1. A butterfly valve for opening and closing a passage therethrough comprising;
   a housing;
   an annular seal mounted in said housing, said annular seal is radially expandable; and
   a rim;
   a disk pivotally mounted in said housing, including the rim on the peripheral face of the disc and a set of ribs having peripheral cooling conduits between the ribs for engaging only a portion of the disk to inhibit heat conduction between the rim and disk with said disk having a peripheral end width greater than a width of said annular seal so that when the rim and disk is in the closed condition the width of the rim and disk isolates the annular seal from transportable materials that are at a temperature that exceeds a breakdown temperature of the annular seal.

2. The butterfly valve of claim 1 wherein the annular seal has a sealing face with a first radius of curvature and the disk has a sealing face with a similar radius of curvature so as to minimize the clearance between the rim and disk and the sealing member when the rim and disk is rotated from a closed position to an open position or vice versa and the annular seal is in an unexpanded condition.

3. The butterfly valve of claim 1 wherein the peripheral cooling conduits between the ribs can cool a peripheral surface of the disk, which can contact the annular seal, to a temperature below the breakdown temperature of the annular seal.

4. The butterfly valve of claim 1 including a set of collars each having a conduit connecting end having a diameter less than the diameter of the annular seal to inhibit hot materials from contacting the annular seal as hot material flows through the butterfly valve.

5. The butterfly valve of claim 1 including a first annular heat conducting flange proximate a first side of the annular seal and a second annular heat conducting flange proximate an opposite side of the annular seal to direct cool the annular seal so as to inhibit the temperature of the annular seal exceeding the breakdown temperature of the annular seal.

6. The butterfly valve of claim 1 including a shaft on the disk with the shaft having a conduit therein wherein a cooling fluid may be directed axially through the shaft on the disk.

7. The butterfly valve of claim 3 wherein cooling conduits in the rim and disk comprises annular conduits having an inlet and an outlet with the inlet and the outlet diametrical opposite from each other.

8. A butterfly valve for opening and closing a passage comprising;
a housing;
an expandable seal mounted in said housing, said housing supporting the expandable seal with at least one cooling channel extending alongside the expandable seal to assist in mating the expandable seal and the housing at a temperature below a breakdown temperature of the expandable seal;
a central member pivotally mounted in said housing with said central member having a width greater than a width of said expandable seal, so that when the central member is in a closed condition the width of the central member substantially isolates the seal from contacting the transportable materials at a temperature that exceeds the breakdown temperature of the expandable seal, said central member includes a peripheral cooling channel for maintaining the temperature of a portion of the central member that contacts the expandable seal when the central member is in a closed condition, said expandable seal is an elastomer having a sealing surface with a radius of curvature substantially equal to a radius of curvature of a portion of the central member that can engage the expandable seal to block a passage therebetween;
a clearance between the central member and the expandable seal, said clearance is less than 0.010 inches when the expandable seal is in an unexpanded condition;
an inlet collar;
an outlet collar with said inlet collar and said outlet collar each having a conduit attachment faceplate with a diameter less than an internal diameter of the expandable seal to inhibit hot transportable materials flowing through the butterfly valve from contacting the expandable seal; and
a rim secured to the central member, said rim having a plurality of ribs for engaging only a portion of the central member to inhibit heat conduction between the central member and the rim.

9. The butterfly valve of claim 8 wherein the housing and the central member are metal.

\* \* \* \* \*

UNITED STATES PATENT AND TRADEMARK OFFICE
CERTIFICATE OF CORRECTION

PATENT NO.         : 8,256,448 B2
APPLICATION NO.    : 12/150715
DATED              : September 4, 2012
INVENTOR(S)        : Steele Page 1 of 1

It is certified that error appears in the above-identified patent and that said Letters Patent is hereby corrected as shown below:

In the Claims:

In claim 1, line 2: "comprising;" should read --comprising:--
In claim 1, line 5: "expandable; and" should read --expandable;--
In claim 1, line 6: "a rim;" should read --a rim; and--
In claim 1, line 8: "the peripheral face" should read --a peripheral face--
In claim 1, line 11: "the rim and disk" should read --the rim and the disk--
In claim 1, line 13: "the rim and disk is" should read --the rim and the disk are--
In claim 1, line 14: "the rim and disk" should read --the rim and the disk--
In claim 2, line 4: "the rim and disk" should read --the rim and the disk--
In claim 2, line 5: "the rim and disk is" should read --the rim and the disk are--
In claim 2, lines 5-6: "a closed position to an open position" should read --the closed condition to the open condition--
In claim 5, line 4: "to direct cool" should read --to directly cool--
In claim 7, line 1: "cooling conduits" should read --the cooling conduits--
In claim 7, line 3: "diametrical opposite" should read --diametrically opposite--

Signed and Sealed this
Twenty-seventh Day of August, 2013

Teresa Stanek Rea
*Acting Director of the United States Patent and Trademark Office*

UNITED STATES PATENT AND TRADEMARK OFFICE
CERTIFICATE OF CORRECTION

Page 1 of 1

PATENT NO. : 8,256,448 B2
APPLICATION NO. : 12/150715
DATED : September 4, 2012
INVENTOR(S) : Steele It is certified that error appears in the above-identified patent and that said Letters Patent is hereby corrected as shown below:

In the Claims:

Column 6, line 50 (claim 1, line 2) "comprising;" should read --comprising:--
Column 6, line 53 (claim 1, line 5) "expandable; and" should read --expandable;--
Column 6, line 54 (claim 1, line 6) "a rim;" should read --a rim; and--
Column 6, line 56 (claim 1, line 8) "the peripheral face" should read --a peripheral face--
Column 6, line 59 (claim 1, line 11) "the rim and disk" should read --the rim and the disk--
Column 6, line 61 (claim 1, line 13) "the rim and disk is" should read --the rim and the disk are--
Column 6, line 62 (claim 1, line 14) "the rim and disk" should read --the rim and the disk--
Column 7, line 1 (claim 2, line 4) "the rim and disk" should read --the rim and the disk--
Column 7, line 2 (claim 2, line 5) "the rim and disk is" should read --the rim and the disk are--
Column 7, lines 2-3 (claim 2, lines 5-6) "a closed position to an open position" should read --the closed condition to the open condition--
Column 7, line 18 (claim 5, line 4) "to direct cool" should read --to directly cool--
Column 7, line 24 (claim 7, line 1) "cooling conduits" should read --the cooling conduits--
Column 7, line 26 (claim 7, line 3) "diametrical opposite" should read --diametrically opposite--

This certificate supersedes the Certificate of Correction issued August 27, 2013.

Signed and Sealed this
Seventeenth Day of September, 2013

Teresa Stanek Rea
*Deputy Director of the United States Patent and Trademark Office*